United States Patent [19]

Lundin et al.

[11] 4,015,193

[45] Mar. 29, 1977

[54] FIRING CIRCUIT

[75] Inventors: Robert S. Lundin, Northfield; John F. Carragan, Woodbury, both of Conn.

[73] Assignee: General Time Corporation, Thomaston, Conn.

[22] Filed: Nov. 11, 1975

[21] Appl. No.: 631,172

[52] U.S. Cl. .................................. 323/19; 323/24; 323/34
[51] Int. Cl.² .......................................... G05F 3/04
[58] Field of Search ....... 307/252 B, 252 N, 252 T; 323/16, 19, 22 SC, 24, 34

[56] References Cited

UNITED STATES PATENTS

| | | | |
|---|---|---|---|
| 3,488,521 | 1/1970 | Smith | 323/22 SC |
| 3,870,904 | 3/1975 | Schock | 307/252 B |
| 3,879,652 | 4/1975 | Billings | 323/22 SC |
| 3,925,688 | 12/1975 | Kalfus | 323/24 X |

Primary Examiner—A. D. Pellinen
Attorney, Agent, or Firm—Pennie & Edmonds

[57] ABSTRACT

The firing circuit serves to interface a load circuit including a semiconductor device capable of large load currents and a control circuit operating at logic power levels and provides a relatively low current output to the gate terminal of the semiconductor device, which may be a triac, for controlling the load circuit.

4 Claims, 9 Drawing Figures $\theta$  $\theta_2\theta_1$  $\theta_3$

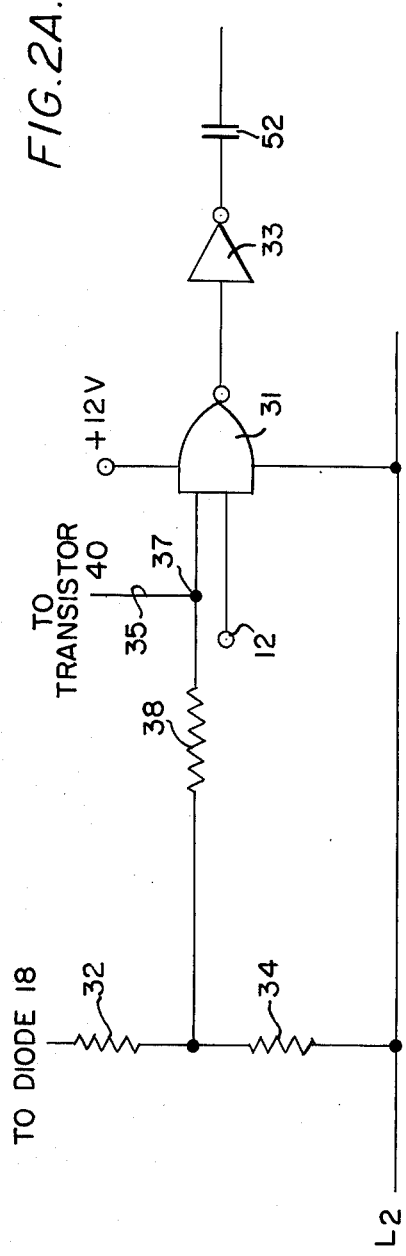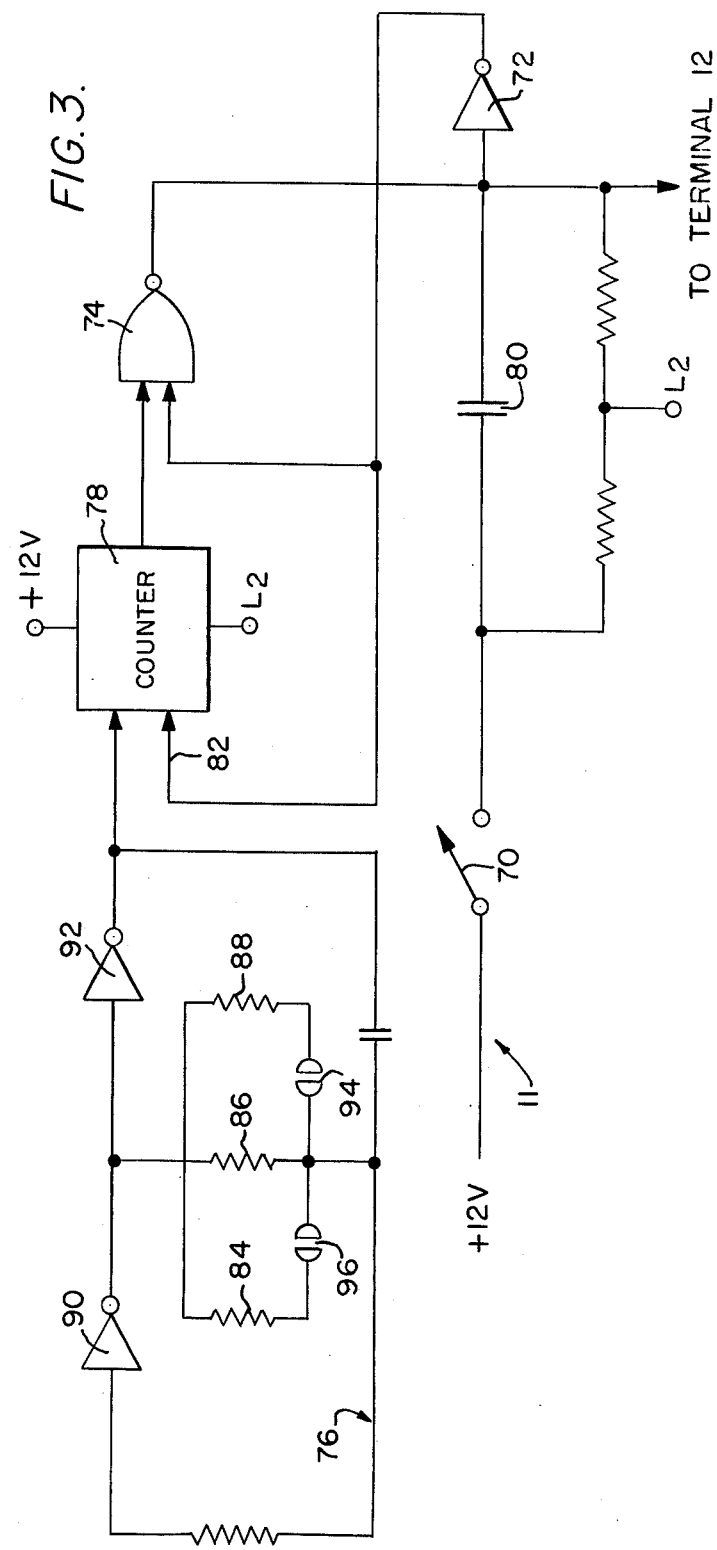

FIRING CIRCUIT

BACKGROUND OF THE INVENTION

A triac is a semiconductor device which is capable of controlling large load currents with considerable flexibility inasmuch as conduction of the anode circuit for each anode polarity, may be produced with either direct current or alternating current signals at the gate terminal. The signal may be of a relatively low current level.

This form of semiconductor device oftentimes forms a portion of the load circuit or final stage of a control circuit which may be of solid state components and whose control functions are carried out at logic power levels. In the prior art the configuration of circuit for interfacing the load circuit and the solid state control circuit has suffered from the disadvantages both of being costly and cumbersome aspects of a solid state control.

BRIEF DESCRIPTION OF THE INVENTION

The present invention is directed to a configuration of circuit for interfacing the circuits as aforementioned in a practical, low cost and highly reliable manner, thereby to overcome the disadvantages of the prior art. In particular, the interfacing circuit, hereinafter the "firing circuit," provides the desired control function through a significant conservation of power. This is an important consideration in permitting the use of lower wattage rating components which take up less room on the circuit board.

Other advantages of the present invention become apparent to those versed in the art as the specifics of the present invention are developed as the specification continues.

DESCRIPTION OF THE DRAWINGS

FIG. 2A is a partial showing of the schematic diagram of FIG. 2 illustrating a modification thereof;

FIG. 3 is a schematic diagram of the control of the firing circuit of FIG. 2.

DESCRIPTION OF THE PREFERRED EMBODIMENT

Figures 1, 4C, 4D:
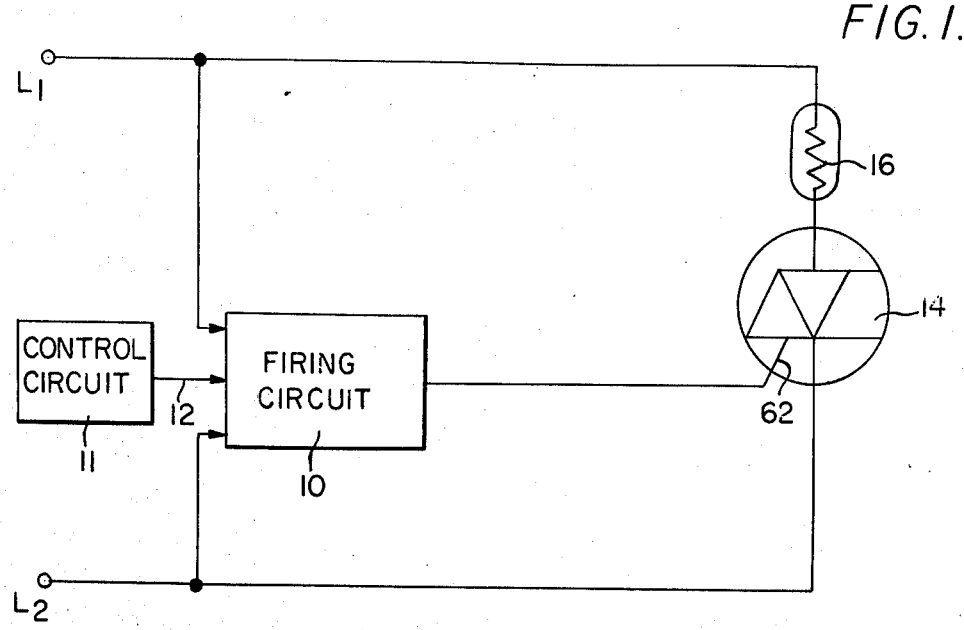
FIG. 1 is a diagram, partially in block form and partially in schematic form, of the load circuit and the firing circuit of the present invention.
FIGS. 4A – 4E are illustrations of certain waveforms, to be more particularly described.

Referring to FIG. 1, there is illustrated a firing circuit 10 which constitutes an interface between a control circuit 11 whose output signal represents an input signal to the firing circuit at the terminal 12 and a load circuit to be controlled. The load circuit may include, for example, a heating and blower circuit of a hot air dryer or any circuit of the type conventionally drawing high current loads from an alternating current source. The load circuit includes a triac 14 connected by one anode to the line $L_1$ through the heating and blower circuit, generally represented by a resistance 16, and by the other anode to the line $L_2$ at a reference potential such as ground. The traic controls the load circuit by means of low power input signals from the firing circuit at its gate terminal during each cycle of the alternating current input.

Figure 2:
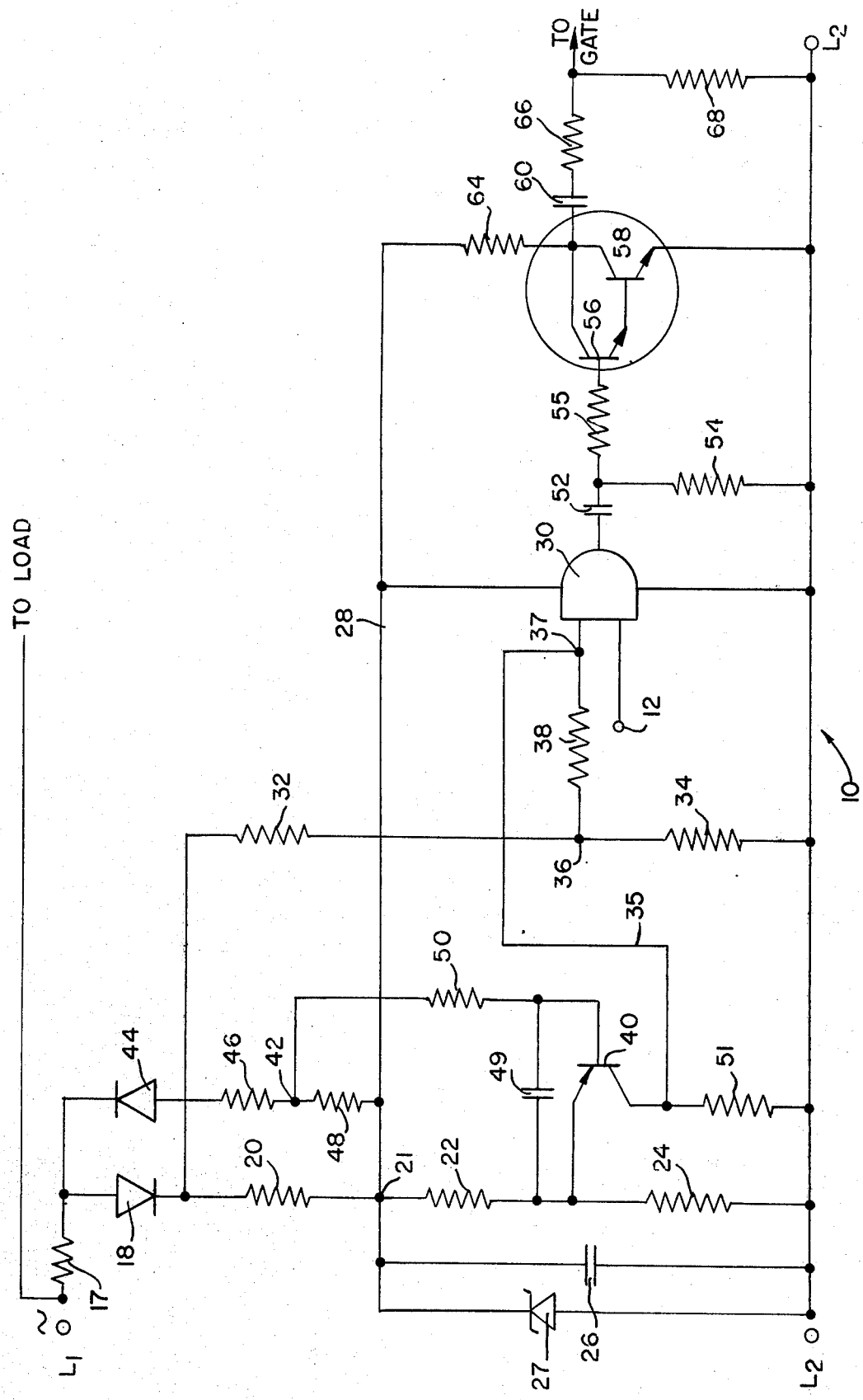
FIG. 2 is a schematic diagram of the firing circuit of FIG. 1.

The input to the firing circuit 10 is across the lines $L_1$–$L_2$ through the network including a diode 18, a plurality of resistors 20, 22, 24 connected in series and both a capacitor 26 and a Zener diode 27 connected in parallel with the resistors 22 and 24 (see FIG. 2). The diode 18 functions as a half wave rectifier and the resistors function as a voltage divider developing during the half cycle when $L_1$ is positive a voltage $E_L$ on the line 28. The line is connected at the junction 21 of resistors 20 and 22 and the voltage $E_L$ may build to a potential of +12 volts D.C. Capacitor 26 is a filter capacitor and serves as a reservoir for power thereby to smooth the D.C. potential during the half cycle when $L_1$ is negative. Zener diode 27 while functioning as a limiting diode to maximize the voltage potential along line 28 is also used as a clamping diode. The resistor 17 is included in the networks across the lines $L_1$–$L_2$ of both diode 18 and diode 44.

During the half cycle when $L_1$ is positive, a first input signal is developed at one input terimnal of AND gate 30. During the half cycle when $L_1$ is negative, a second input signal is developed at the same input terminal. Thus, during both half cycles the possibility of an output signal from AND gate 30 exists and as is well known AND gate 30 will provide an output signal at such times as there are and during the duration of simultaneous input signals at both input terminals. Particularly, the first input signal is developed at input terminal 37 of AND gate 30 connecting with the junction 36 through the resistor 38. Junction 36 is between resistors 32 and 34, in series with diode 18. The input signal is across the resistor 38 which serves to limit current to the gate. The second input signal to AND gate 30 is the outpt signal of transistor 40 on line 35 connecting the collector to junction 37.

The emitter of transistor 40 is connected at the junction between the resistors 22 and 24 providing further voltage division between the +12 volt and reference potentials. The emitter of transistor 40 is maintained at a D.C. potential of about +10v. During the half cycle when $L_1$ is positive, transistor 40 is in the non-conducting state.

During the half cycle when $L_1$ is negative, the voltage at point 42 taken with respect to the emitter of transistor 40 may be expressed as $$E_{(42)} = E_1 - E_L \sin \omega t \quad (1)$$

where $E_1$ is the voltage across the resistor 22 and $E_L$ is the voltage along line 28.

It is seen that $E_{(42)}$ wll be negative and capable of causing transistor 40 to conduct when $$\sin \omega t > E_1/E_L \quad (2)$$

Since $E_1$ is small compared to $E_L$, the transistor will begin to conduct very shortly after the sine wave commences into the half cycle when $L_1$ is negative.

As may be appreciated, diode 44 functions as a half wave rectifier and resistors 46 and 48 function as a voltage divider during the half cycle when $L_1$ is negative. Resistor 50 is a limiting resistor limiting the current to the base of transistor 40 as the voltage at point 42 increases during the balance of the negative half cycle. The resistor 51 connected between the collector of transistor 40 and $L_2$ develops the voltage output at the intput terminal 37 of AND gate 30 during the negative half cycle. The capacitor 49 provides control for inductive loads.

The other input terminal 12 of AND gate 30 is connected to the control circuit, a possible form of which is illustrated to advantage in FIG. 3 to be described below. The control circuit may develop a logic input signal at the terminal 12 over a time interval, for example, of 30 seconds to a minute or more as requirements dictate. During this time interval AND gate 30 will provide an output signal which is the summation of the input signals at the input terminal 37.

As illustrated in FIG. 2, AND gate 30 is connected across line 28 and the line $L_2$ to be powered by the +12v. potential along the line 28. As is characteristic of C-MOS gates, AND gate 30, assuming an input signal at terminal 12, provides an output signal when the voltage at the input terminal 37 reaches approximately 70% of the voltage which powers gate operation. In the present embodiment AND gate 30 will be gated "on" when the voltage at the input terminal 37 reaches approximately 8.4 volts. AND gate 30 will remain "on" during the period of time that the voltage exceeds 8.4 volts.

In an alternative embodiment, (see FIG. 2A) AND gate 30 is replaced by a NAND gate 31 and an inverter 33. These logic devices are arranged in the firing circuit in the manner of the arrangement of AND gate 30. As a further alternative, AND gate 30 could be a similar AND gate in another semiconductor technology, such as transistor logic (not shown).

Figure 4A:
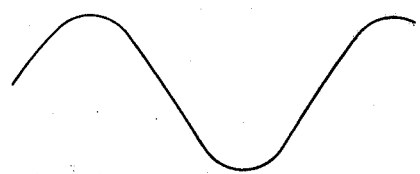
Figure 4B:
Figure 4E:
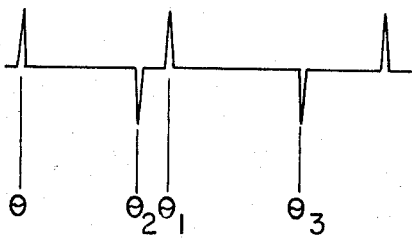

The alternating current input across lines $L_1$–$L_2$ may be seen in FIG. 4A. FIG. 4B representative of the signal at the input terminal 37 of AND gate 30 during the half cycle when $L_1$ is positive in actuality appears internal to the AND gate 30. FIG. 4C is representative of the signal at the same input terminal during the half cycle when $L_1$ is negative. Since during a full cycle and during each subsequent cycle a logic input is connected at the input terminal 12 there is an output signal (FIG. 4D) to a differentiating circuit including the capacitor 52 and resistor 54. The output signal of AND gate 30 is the summation of the input signals as the input terminal 37 during a complete cycle. The differentiated output signal of the AND gate is represented by the spiked pulses in FIG. 4E. The first positive pulse occurs at a phase angle of $\theta$, while the second positive pulse of the first cycle occurs at a phase angle of $\theta_1$. Thereafter, the positive pulses are repeated at like phase angle orientations in succeeding cycles. Negative pulses occur when the phase angle is $\theta_2$ and $\theta_3$, the negative pulses likewise being repeated in succeeding cycles.

The phase angle $\theta$ will be between 0° and about 60° depending upon the amplitude of the input at $L_1$. Since the input is sinusoidal the first negative pulse will occur at the phase angle $\theta_2$ which will be between about 120° and 180°. According to the above equations phase angle $\theta_1$, the second positive pulse, and $\theta_3$, the second negative pulse, occur at about 190° and 350°, when the transistor begins to conduct and stops conducting, respectively. Preferably, the input signal at $L_1$ will be such that the positive pulses occur at substantially similar orientations of phase angles after the sine wave crosses the zero axis.

Each positive pulse causes the transistors 56 and 58 arranged in a Darlington configuration to conduct, briefly. Since a pulse from the differentiator network occurs very shortly after the beginning of each half cycle, the capacitor 60 is discharged through the transistor configuration into the gate 62 of the triac (see FIG. 1) thereby triggering the triac "on" after a short interval of the start of each half cycle when the triac shall have been turned "off." The resistor 55 limits current to the base of transistor 56.

The capacitor 60 is charged by the +12 v. potential on line 28 through resistor 64 during each half cycle. Discharge of the capacitor occurs over a period of about 10$\mu$s. Thus, the charging time is carried out over substantially the entire half cycle, and the current drain from the +12 v. line is of the order of a few milliamperes at the start of the charging pulse, diminishing to practically zero current drain at the end of the charging pulse. The energy stored in the capacitor is quickly discharged delivering about 100 ma. to the gate 62. The output to the gate is at the junction of the voltage dividing resistors 66 and 68.

The Darlington configuration could be replaced by a single transistor of the NPN-type having sufficient gain to handle the current discharged through its emitter-collector junction.

The present system has a very wide range of operation. Typically, line voltage variations of from about 90 volts to and through 305 volts will not jeopardize performance. And the system provides energy conservation as a consequence of the reduction in current capacity of the power supply and the power dissipated by resistor 20.

For purposes of example and not to limit the invention the following table sets out a nominal value for the components of the firing circuit.

| Component | Nominal Value |
| --- | --- |
| Diode 18 | 500 V. |
| Diode 44 | 500 V. |
| Resistor 17 | 10 K |
| Resistor 20 | 12 K |
| Resistor 22 | 15 K |
| Resistor 24 | 27 K |
| Resistor 32 | 33 K |
| Resistor 34 | 47 K |
| Resistor 38 | 39 K |
| Resistor 46 | 470 K |
| Resistor 48 | 470 K |
| Resistor 50 | 1 M |
| Resistor 51 | 10 K |
| Resistor 54 | 27 K |
| Resistor 55 | 1 K |
| Resistor 64 | 3.3 K |
| Resistor 66 | 10 Ω |
| Resistor 68 | 1 K |
| Capacitor 26 | 100 $\mu f$ |
| Capacitor 49 | .0024 $\mu f$ |
| Capacitor 52 | .0024 $\mu f$ |
| Capacitor 60 | 1.0 $\mu f$ |

Each of the resistors referred to above may have a tolerance of ±10% and may be formed of a carbon composition or deposited carbon film or metal film. The resistors, variously, are rated from about ¼ w to about 2 w. Capacitors 26 and 60 have a tolerance of −10%/+150% and may be of the aluminum electrolytic type. Capacitors 49 and 52 may be of the ceramic disc type.

Turning now to FIG. 3, the control circuit 11 generally includes a switch 70, a latching network including an inverter 72, and a NOR gate 74, a free-running multivibrator 76 and a counter 78. The control circuit provides a signal during a controlled time interval which constitutes the input signal at terminal 12 of AND gate 30.

Switch 70 is connected to the +12v. potential along line 28 and upon closure of the switch a positive going input pulse is coupled by capacitor 80 to the input terminal of inverter 72. The output of the inverter is connected to one input of NOR gate 74 and to counter 78, at the reset terminal 82. As illustrated, the output of NOR gate 74 is returned to the input terminal of inverter 72 as well as to the terminal 12 of AND gate 30. The output of the NOR gate serves to latch the circuit providing an input at terminal 12 during the time interval until an input signal is received at the other input terminal of NOR gate 74 and the circuit is unlatched. In actuality the input signal at the terminal 12 was first received at the time of switch closure. The signal at terminal 12, however, will be substantially continuous from that time because of the substantially instantaneous operation of the integrated circuit components.

The free-running multivibrator 76 includes a plurality of timing resistors 84, 86 and 88 which are arranged in parallel between a pair of inverters 90 and 92. The output signal of the multivibrator may be varied by receipt of a shorting screw 94 and/or 96 into the circuit board, thereby to shunt the timing resistor 86 with one or the other or both of timing resistors 84 and 88.

Counter 78 may include a plurality of serially arranged flip-flops (not shown). The counter when the reset input is removed will function to provide an output as the time determined by the physical make-up of the multivibrator. In the present embodiment the counter may provide an output after passage of intervals of one of 30, 40 and 180 seconds. The counter output signal is connected to the other input terminal of NOR gate 74 to unlatch the circuit including NOR gate 74 and inverter 72 thereby to terminate the input signal at terminal 12. The second and each subsequent operation of the firing circuit is likewise initiated by closure of the switch 70.

As was discussed heretofore in connection with AND gate 30, each of the integrated circuit components of the control circuit and the modified firing circuit are powered by the +12 potential along line 28. For the sake of overall illustration the circuit connections are now shown.

Likewise, for purposes of example and not to limit the invention the following table sets out a nominal value for the components of the control circuit.

| Component | Nominal Value |
| --- | --- |
| Resistor 84 | 270 K |
| Resistor 86 | 1 M |
| Resistor 88 | 180 K |
| Capacitor 80 | .0024 µf |

The resistors may be formed as the resistors heretofore mentioned and may have a tolerance of ±5%. The capacitor 80 may be of the ceramic disc type. The components not specifically referred to provide normal control circuit functions.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. A firing circuit providing an input signal during each half cycle at a control gate of a semiconductor device in a load circuit across an alternating current source, each said input signal energizing said load circuit during the remainder of said half cycle, and said firing circuit comprising a logic gate having a pair of input terminals, control means providing an input signal at one of said input terminals, first circuit means including a first diode connected between said alternating current source and the other of said input terminals providing half wave rectification during the positive half cycle of said alternating current source, a pair of voltage divider means, said voltage divider means connected in series with said diode across said alternating current source, said pair of voltage divider means including a first junction and a second junction at a lower voltage potential, second circuit means connected between said alternating current source and said other input terminal providing an input signal during the negative half cycle of said alternating current source, said second circuit means including transistor means, the emitter of said transistor means being connected to said second junction, and a second diode connecting the base of said transistor means to said alternating current source during said negative half cycle, said logic gate providing an output signal during each half cycle, a D.C. source connected to said first junction, said logic gate being powered by said D.C. source, and means for electrically connecting said logic gate output signals to said control gate at selected times during each half cycle.

2. The firing circuit of claim 1 including a capacitor, said capacitor being connected across said first junction for maintaining said D.C. source at a substantially constant positive potential.

3. The firing circuit of claim 1 wherein said means at said logic gate output includes differentiating means for developing a plurality of positive and negative going pulses, and further transistor means connected to said differentiating means and controlled "on" during the duration of each positive pulse, each positive pulse occuring at a phase angle substantially at the beginning of each half cycle.

4. The firing circuit of claim 3 wherein said means at said logic gate output further includes a capacitor, said capacitor being connected in series with said D.C. source thereby to charge to the potential of said D.C. source and in parallel with said further transistor means, said capacitor discharge through said further transistor means upon each positive pulse providing said input signal at said control gate.

* * * * *